June 21, 1960   J. F. BURKE ET AL   2,941,830
HERMETIC SEAL AND METHOD OF MAKING SAME
Filed Jan. 22, 1957   2 Sheets-Sheet 1

INVENTOR.
John F. Burke
Nicholas J. DeLollis
BY W. E. Thibodeau, T. J. Lynch & J. P. Edgerton

2,941,830

HERMETIC SEAL AND METHOD OF MAKING SAME

John F. Burke, Silver Spring, Md., and Nicholas J. De Lollis, Albuquerque, N. Mex., assignors to the United States of America as represented by the Secretary of the Army Filed Jan. 22, 1957, Ser. No. 635,552

4 Claims. (Cl. 288—1)

(Granted under Title 35, U.S. Code (1952), sec. 266)

This invention described herein may be manufactured and used by or for the Government for governmental purposes without the payment to us of any royalty thereon.

This invention relates to a seal structure, and a method of fabricating the structure. More particularly, this invention relates to a seal between a metal and a thermoplastic resin, and a method for effectively accomplishing a seal between these materials.

Attempts have been made to structurally join a relatively flexible, elastic and resilient thermoplastic resin to a metal, in order that the advantageous characteristics of both can be utilized in a single combination.

In general, a substantially hermetic union between these materials cannot be formed unless external sealing means are employed. Practical and economical seals and seal assemblies have been utilized, but none can effectively withstand sustained pressures and still maintain hermetically sealed conditions. The inherent cold flow of the thermoplastic resin is responsible for the undesirable results attained. Cold flow is the movement resulting from stresses and strains that affect the flexibility, resiliency and elasticity characteristics of the thermoplastic resin.

Accordingly it is an object of this invention to provide a seal structure adapted to maintain hermetically sealed conditions under sustained pressures.

Another object is to provide a seal structure, between a flexible, elastic and resilient thermoplastic resin and a metal, capable of withstanding sustained pressures.

A further object is to provide a method for forming a seal structure which is adapted to maintain hermetically sealed conditions under sustained pressures.

A further object is to provide a method for forming a seal structure between a flexible, elastic, and resilient thermoplastic resin and a metal, capable of withstanding sustained pressures.

Briefly, the seal structure of this invention is comprised of a thermoplastic resin member hermetically bonded to a thermosetting resin member, the latter being threadedly connected to a metallic member. The method of forming the seal structure contemplates generally a coalescense of thermoplastic member to the thermosetting member by means of a seal rendering the juncture of the resinous materials hermetic even under sustained pressure conditions.

The specific nature of the invention as well as other objects, uses and advantages thereof will clearly appear from the following description and from the accompanying drawing, in which.

Figure 1:
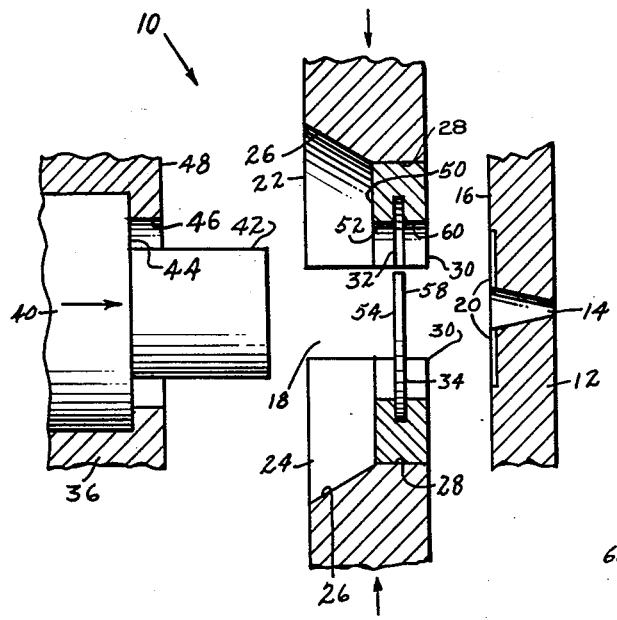
Figure 1 is a partial cross section of the transfer mold illustrating the associated parts as separated and an insert mounted in a split ring of the mold.
Figure 3:
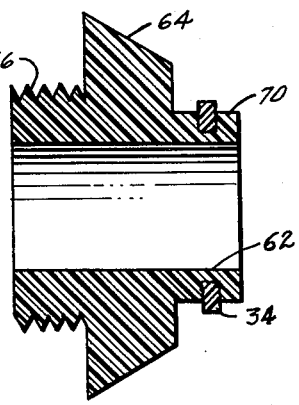
Figure 3 is a sectional view of the finished product from the transfer molding operation.
Figure 2:
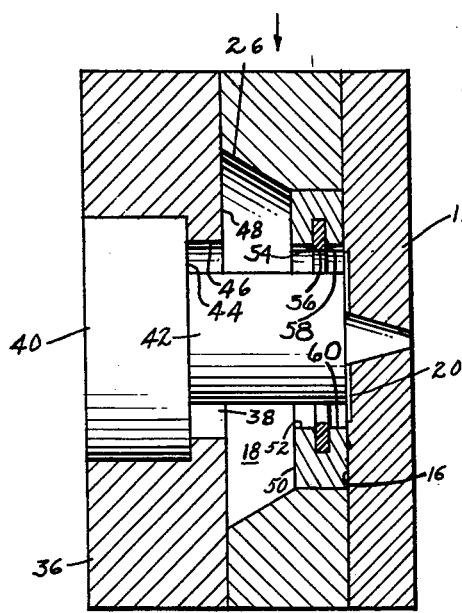
Figure 2 is similar to Figure 1 with the associated parts of the transfer mold positioned immediately prior to resin injection.

Referring to Figures 1 and 2, a transfer mold, generally indicated as 10, presents die surfaces which may be adapted to form a substantially annular coupling member (member 61 in Fig. 3). Mold 10 can have a relatively flat stationary plate 12 in which is formed a conical sprue 14. Extending radially from sprue 14 in the internal surface 16 of plate 12, and in communication with die cavity 18 may be recessed passages 20 for the fluid resin entering sprue 14 from any suitable source. Cooperating with plate 12 to form a major portion of the die cavity 18 may be movable die members 22 and 24. When placed in the desired cooperating relationship as in Figure 2, die members 22 and 24 may present conical die surfaces 26, and cylindrical surfaces 28. Surfaces 28 may conveniently mount a split ring 30 formed with an annular recess 32 for suitable mounting of a ring shaped insert or gasket 34. Insert 34 is preferably fabricated from a thermoplastic resin such as polyethylene. Completing the formation of die cavity 18 is movable member 36 preferably having a circular opening 38 to conveniently support a solid cylindrical die ram 40. Thus, as can be observed in Figure 2, the ultimate die cavity 18 may be formed by die surfaces 42, 44, 46, 48, 26, 50, 52, 54, 56, 58, 60 and 16.

In operation, the thermoplastic insert or gasket 34 is placed in the split ring recess 32. The die members of the transfer mold 10 are properly brought into cooperating relation to form die cavity 18 as in Figure 2. A suitable thermosetting plastic resin such as Plaskon 442, which is a styrene-modified polyester type of alkyd resin, is then forced into cavity 18 under suitable and conventional temperatures and pressures. Means can be provided through the die surfaces for enabling the air within cavity 18 to escape as the resin is being inserted, such as predeterminately spaced minute apertures. Suitable temperatures and pressures are maintained on the thermosetting resin to effect proper curing as is conventionally done for a reasonable length of time. The heat to which the thermosetting resin is subjected will be sufficient to soften the thermoplastic insert 34. The pressure within the die cavity is such that a coalescence or firm surface-to-surface bonding of the resins will develop, as shown more clearly in Figure 6. Though these two resins are mutually incompatable an interlinking or intermixing of the resin surfaces at the juncture will result, providing a superior bond upon curing.

Figure 5:
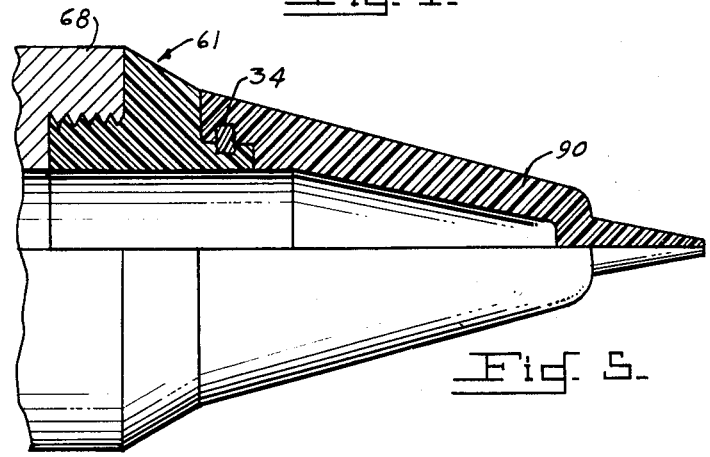
Figure 5 is a partial sectional view of the finished product of Figure 4 secured to a metallic member.

After suitable curing of the thermosetting resin the finished product is suitably removed from the die cavity 18 and assumes substantially the form illustrated in Figure 3. Thus, this molded product 61 which may be termed an annular coupling member, has a longitudinal bore 62 and an intermediate conical flanged portion 64. End surface 66 preferably presents means such as threads or a groove or any suitable means for providing a threaded connection with a correspondingly internally threaded metallic member 68 as shown in Figure 5. Member 68 and nose 80 form the metallic nose end of an ordnance missile. Nose 80 is to be hermetically sealed by thermoplastic member 90. The thermosetting material employed should preferably result in a relatively rigid end product so that no cold flow will ensue at the juncture of this product with the metallic member 68 because of any sustained pressures. Distal the end that presents surface 66 will be disposed end 70 that has radially protruding therefrom annular insert 34.

Figure 4:
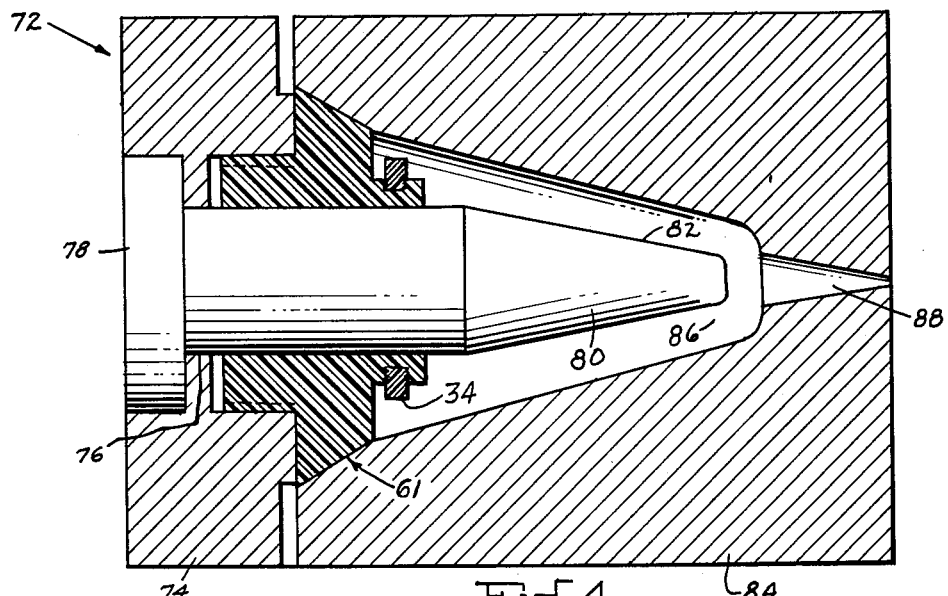
Figure 4 is a partial sectional view of the finished product of Figure 3 inserted in an injection mold.

The annular coupling member 61 is then inserted in a conventional injection mold 72 as shown in Figure 4. This injection mold 72 may comprise movable die member 74 having an opening 76 in which a die ram 78 is disposed. Ram 78 may have an elongated nose 80 on which the member 61 is mounted before closing the mold to effect resin injection. Nose 80 also presents die surfaces 82 that are spaced from the internal surfaces of the cavity within stationary die member 84 when mold 72 is closed and awaiting the injection cycle, to form die cavity 86.

Figure 6:
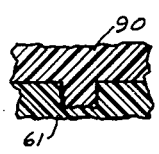
Figures 6 to 9 are sectional views of the seals of this invention.

In operation, a thermoplastic resin such as polyethylene, which is preferably the same material as insert 34, is injected from a suitable source through sprue 88 into die cavity 86. The thermoplastic resin will be injected into cavity 86 at suitable conventional temperatures and pressures and the entrapped air in cavity 86 may be drawn off through suitable apertures in member 84. The heat of the injected resin will be sufficient to substantially soften the annular insert 34. The combination of heat and pressure will be such as not to affect the thermosetting resin of coupling member 61, but will enable the material of the insert 34 to become integral with the injected resin since these materials are preferably mutually compatible. The finished product of this operation after proper cooling may assume the configuration substantially as shown in Figure 5 of a thermoplastic resin conical member 90 bonded to coupling member 61. Member 61 may then be suitably connected to a metallic member 68. When so assembled thermoplastic member 90 hermetically seals nose 80 against moisture or air. The juncture of member 90 with member 61 is illustrated in Figure 6. As will be evident a hermetic juncture is obtained that will withstand efficiently sustained pressures without failure to maintain air tight and moisture proof conditions. It is through the medium of a thermosetting resin that a relatively resilient, flexible and elastic thermoplastic resin is hermetically sealed to a metal. One or both of the resins, but preferably the thermosetting resin, may have suitable filler material such as fiber glass, wool, or cotton to increase the performance of the seal.

Figure 7:
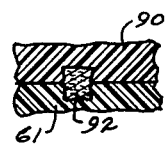

In Figure 7 a fibrous annular insert 92 may be employed as an alternative but obviously not as an equivalent of insert 34. The resins during each molding operation will penetrate the interstices of insert 34 and upon proper curing and cooling of the resins a hermetic juncture will be attained.

Figure 8:
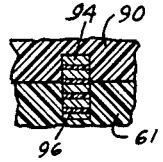

As shown in Fig. 8, a metallic insert 94 can be utilized. To counteract the inherent cold flow of the thermoplastic resin, such as polyethylene, on the metal, this insert is preferably provided with apertures 96. Apertures 96 provide access for the resins and tend to interlock the resins in a unifying manner. Thus an air-tight, moisture proof hermetic seal is possible which is capable of withstanding sustained pressures.

Figure 9:
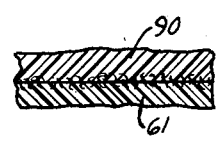

As mentioned above, the thermosetting resin may have suitable filler material in fibrous form. If sustained pressures of great magnitude and duration are not contemplated, a substantial seal can be effected between the resins by dispensing with insert 34 and subjecting end 70 to a suitable sand blasting or machining operation, upon expiration of proper curing. This operation will expose a substantial quantity of the fibers, as illustrated in Figure 9, and provide sufficient interlocking means for the thermoplastic resin to bind to, so that cold flow will be substantially eliminated.

It will be apparent that the embodiments shown are only exemplary and that various modifications can be made in construction and arrangement within the scope of the invention as defined in the appended claims.

We claim:

1. The method of providing a hermetic seal capable of withstanding sustained pressures between a thermoplastic resin and a thermosetting resin comprising the steps of: inserting a thermoplastic insert in a die cavity; supporting said insert in a recessed portion in the walls of said cavity so that said insert will have an exposed portion and an unexposed portion with respect to said cavity; injecting a thermosetting resin into said cavity at a predetermined temperature and pressure in such a manner that surfaces of said exposed portion of said thermoplastic insert interlock with corresponding surfaces of said thermosetting resin; curing said thermosetting resin; removing the resulting product from said cavity; inserting said resulting product in a second mold wherein the said unexposed portion of said insert will now be exposed within the cavity of said second mold; injecting a thermoplastic resin into the cavity of said second mold so that said thermoplastic insert will be interlocked with said thermosetting resin; and subjecting said thermoplastic resin to suitable cooling; whereby any cold flow of said thermoplastic resin relative to said thermosetting member will be substantially eliminated.

2. The method of providing a hermetic seal capable of withstanding sustained pressures between a thermoplastic resin and a metal comprising the steps of: inserting a thermoplastic ring shaped insert in a die cavity; supporting said insert in an annular recess in the walls of said cavity so that an internal circumferential portion of said insert is exposed in said cavity; injecting a thermosetting resin into said cavity at a predetermined temperature and pressure in such a manner that surfaces of said internal circumferential portion of said thermoplastic insert interlock with corresponding surfaces of said thermosetting resin; subjecting the thermosetting resin to curing at suitable temperatures and pressures for a reasonable length of time; removing the resulting molded product from said cavity, inserting said resulting product in a second mold wherein the outer circumferential portion of said insert will be exposed in the cavity of said second mold; injecting a thermoplastic resin into the cavity of said second mold under predetermined temperature and pressure so that the exposed portion of said insert will be interlocked with said thermoplastic resin; subjecting said thermoplastic resin to suitable cooling; whereby any cold flow of said thermoplastic resin relative to said thermosetting member will be substantially eliminated; and removing the finished product.

3. The method of providing a hermetic seal capable of withstanding sustained pressures between a thermoplastic resin and a thermosetting resin comprising the steps of: supporting a thermoplastic insert in a recessed portion in the walls of a die cavity so that said insert will have an exposed portion and an unexposed portion with respect to said cavity; molding a second relatively rigid thermosetting material to said exposed portion in said cavity in such a manner that the surface of said exposed portion of said thermoplastic insert interlocks with corresponding surfaces of said thermosetting material; removing the resulting product from said cavity; inserting the resulting product into a second mold wherein the said unexposed portion of said thermoplastic insert will be exposed within the cavity of said second mold; injecting thermoplastic resinous material into the cavity of said second mold so that the portion of said thermoplastic insert now exposed will be bonded to said thermoplastic material, whereby any cold flow between said thermoplastic material and said thermosetting resin will be substantially eliminated; and then removing the finished product from said second mold.

4. Means for providing a hermetic seal capable of withstanding sustained pressures between a thermoplastic resin and a metallic member comprising in combination: a metallic member, an annular thermosetting coupling threadedly connected to a first portion of said metallic member, said metallic member having a second portion extending from said first portion, said thermosetting member having a groove around its outer periphery, a first thermoplastic member comprising a ring-shaped insert, said insert having a portion designed to be fitted into said groove, said portion in said groove being bonded therein thereby fixing said insert to said thermosetting coupling, the remaining portion of said ring extending beyond the outermost edges of said groove, and a second thermoplastic member hermetically sealed to said second portion of said metallic member, said second thermoplastic member being fixed to said thermosetting member by bonding to said portion of said thermoplastic insert which extends outwardly beyond the outermost edges of said groove.

References Cited in the file of this patent

UNITED STATES PATENTS

| | | |
|---|---|---|
| 1,308,330 | Brown | July 1, 1919 |
| 1,977,876 | Groff | Oct. 23, 1934 |
| 2,433,425 | Burckle | Dec. 30, 1947 |
| 2,565,803 | Danielson | Aug. 28, 1951 |
| 2,626,167 | Lake | Jan. 20, 1953 |
| 2,663,910 | Danielson et al. | Dec. 29, 1953 |
| 2,724,868 | Kish | Nov. 29, 1955 |